(12) United States Patent
Benco et al.

(10) Patent No.: US 7,203,478 B2
(45) Date of Patent: Apr. 10, 2007

(54) NETWORK SUPPORT FOR MOBILE SERVICE PLAN MINUTE EXCHANGE BY CATEGORY

(75) Inventors: David S. Benco, Winfield, IL (US); Sandra L. True, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 445 days.

(21) Appl. No.: 10/730,335

(22) Filed: Dec. 8, 2003

(65) Prior Publication Data

US 2005/0125305 A1 Jun. 9, 2005

(51) Int. Cl.
 *H04M 11/00* (2006.01)
(52) U.S. Cl. ............... 455/406; 455/405; 455/407; 455/408; 455/409; 455/517; 455/414.1; 379/114.01; 379/114.2; 705/26; 705/400
(58) Field of Classification Search ........... 455/405, 455/406, 407, 408, 409, 414.1, 550.1, 455, 455/551, 517; 379/114.15, 114.16, 114.17, 379/114.18, 114.19, 114.2, 114.01, 114.07, 379/114.08, 114.09, 114.1, 114.11, 114.12, 379/114.23, 114.26, 118; 705/26, 400, 1
See application file for complete search history.

(56) References Cited

U.S. PATENT DOCUMENTS

| | | | | |
|---|---|---|---|---|
| 5,974,308 | A * | 10/1999 | Vedel | 455/407 |
| 6,101,379 | A * | 8/2000 | Rahman et al. | 455/406 |
| 6,532,366 | B1 * | 3/2003 | Chung et al. | 455/445 |
| 6,564,047 | B1 * | 5/2003 | Steele et al. | 455/405 |
| 6,987,844 | B2 * | 1/2006 | Himmel et al. | 379/114.2 |
| 2003/0129962 | A1 * | 7/2003 | Chaney | 455/406 |
| 2004/0006507 | A1 * | 1/2004 | Laufer | 705/10 |
| 2004/0224661 | A1 * | 11/2004 | Pericas et al. | 455/406 |

* cited by examiner

*Primary Examiner*—Joseph Feild
*Assistant Examiner*—Olumide Ajibade-Akonai

(57) ABSTRACT

One embodiment of the present method is for allowing a mobile subscriber to negotiate via a mobile terminal a trade of minutes by category according to a predetermined exchange rate as set forth by a service provider. In this embodiment the method may have the steps of: providing a plurality of categories of usage associated with a mobile terminal, the mobile terminal having associated therewith predetermined amounts of time respectively for the categories during a predetermined time interval; tracking, by the telecommunication network, respective time used by the mobile terminal in each category of the plurality of categories during the predetermined time interval; initiating, by the mobile terminal, a trade transaction with the telecommunication network; sending, from the telecommunication network to the mobile terminal, current amount of used time respectively in each category of the plurality of categories; selecting, at the mobile terminal, at least a portion of at least one remaining time in one category of the plurality of categories for transfer to at least one other category of the plurality of categories, for a respective category, a remaining time of the respective category being a respective amount of time during the time interval less a respective current amount of used time for the respective category; sending, from the mobile terminal to the telecommunication network, the selection; and transferring, at the telecommunication network and according to the selection, at least a portion of at least one remaining time in one category of the plurality of categories to at least one other category of the plurality of categories. The system implements the method.

32 Claims, 4 Drawing Sheets

NETWORK SUPPORT FOR MOBILE SERVICE PLAN MINUTE EXCHANGE BY CATEGORY

TECHNICAL FIELD

The present invention relates to wireless telephony in general, and, more particularly, to a method and system for allowing a mobile subscriber to negotiate via a mobile terminal a trade of minutes by category according to a predetermined exchange rate as set forth by the service provider.

BACKGROUND OF THE INVENTION

Wireless telephones, which include both cellular telephones and the higher frequency personal communication devices, are growing in numbers and also shrinking in size and weight. The growth in numbers is influenced by the convenience and the per call cost of wireless telephones with respect to pagers and wire line telephones or coin telephones for completing calls, especially when the user is away from home or office.

Currently, the billing system of the cellular network differs from that of the Public Switched Telephone (wireline) Network (PSTN). Unlike the PSTN network, subscribers in the cellular network can be charged not only on a per month basis for local calls, but also on a per call basis depending on the plan purchased. For example, a subscriber can choose a plan that allots a certain number of minutes of air time for a set fee before being charged for air time usage. The amount of air time usage is based not only on calls placed from the mobile terminal, but also on calls received by the mobile terminal.

The use of cellular telephones has increased dramatically over the last few years. Subscribers to cellular telephone service generally are billed for the time the telephone is in use. The cellular service providers as marketing tools employ novel or creative billing packages.

Often the billing packages include a combination of rates. For example, the service may offer unlimited free off-peak time, limited free off-peak, reduced rates for different times of the day, graduated rates based upon volume usage and so forth. It will be appreciated that regardless of the billing package employed, the telephone user has a keen interest in tracking the amount of time the telephone is in use, for obvious reasons.

Most cellular telephones have a simple built-in timer that indicates the duration of the last call or the total usage since the timer was last reset. These simple timers are of little utility to the user who wishes to track his or her monthly peak or off-peak usage. The user may want to track the total number of peak minutes used in a given billing period. With primitive timers, the user may receive an unexpectedly large bill at the end of the month.

The user also may want to track the remaining balance of free minutes. For example, the user may forego using the telephone at certain times of the day for fear of going over budget when, in reality, the user still has unused free or reduced rate time available in the billing period.

Most service plans include a set number of calling minutes at a monthly rate, with extra time available at a per-minute rate. But minutes are only part of the picture; there are other usage habits to consider. For example, will you make most of your calls during or after business hours? Most plans differentiate "peak" and "off-peak" minutes, and may offer a generous number of off-peak minutes (evenings and/or weekends) as part of your monthly fee, or at a substantial discount. One-price calling plans that don't restrict usage times or minutes are becoming popular with heavy users. You usually can't carry over unused minutes from one month to the next, which inflates the per-minute cost of the calling time you do use.

Also known is a rollover program. If you have package minutes left over at the end of the month, they roll over to next month's minutes. In one known program the minutes expire after a year, and the program doesn't apply to night and weekend minutes.

Although most handsets can keep a running count of minutes used, they can't differentiate between peak and off-peak periods. Also, "Evening" and "weekend" may mean different things to different carriers (and even plans from the same carrier). The carriers aren't always helpful when it comes to tracking minutes. Sometimes the information can be as much as a day old. If you roam off your carrier's network, those fees might take a month or two to catch up with you.

As a result of these different known plans, many times a subscriber at the end of a billing cycle may have unused minutes of different amounts in different categories (such as peak minutes and off-peak minutes). Typically, these minutes are lost to the subscriber at the end of a billing cycle. It is a drawback of the prior art that a subscriber is not able to trade some or all of the minutes in a one category of usage for the same or a different number of minutes in a different category.

Therefore, there is a need in the prior art for a subscriber to be able to initiate a trade of, for example, off-peak minutes for peak minutes using their telecommunication network.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, one embodiment of the present method is for allowing a mobile subscriber to negotiate via a mobile terminal a trade of minutes by category according to a predetermined exchange rate as set forth by the service provider. The method may have the steps of: providing a plurality of categories of usage associated with a mobile terminal, the mobile terminal having associated therewith predetermined amounts of time respectively for the categories during a predetermined time interval; tracking, by the telecommunication network, respective time used by the mobile terminal in each category of the plurality of categories during the predetermined time interval; initiating, by the mobile terminal, a trade transaction with the telecommunication network; sending, from the telecommunication network to the mobile terminal, current amount of used time respectively in each category of the plurality of categories; selecting, at the mobile terminal, at least a portion of at least one remaining time in one category of the plurality of categories for transfer to at least one other category of the plurality of categories, for a respective category, a remaining time of the respective category being a respective amount of time during the time interval less a respective current amount of used time for the respective category; sending, from the mobile terminal to the telecommunication network, the selection; and transferring, at the telecommunication network and according to the selection, at least a portion of at least one remaining time in one category of the plurality of categories to at least one other category of the plurality of categories.

Also, in general terms, one embodiment of the present system is for that allows a mobile subscriber to negotiate via a mobile terminal a trade of minutes by category according to a predetermined exchange rate as set forth by a service provider. The system may have: a MSC time trade controller in the telecommunication network and a mobile time trade controller in the mobile terminal; a plurality of categories of usage associated with the mobile terminal, the mobile terminal having associated therewith predetermined amounts of time respectively for the categories during a predetermined time interval; tracking module in the telecommunication network, that tracks and stores respective time used by the mobile terminal in each category of the plurality of categories during the predetermined time interval, the tracking module operatively connected to the MSC time trade controller; a trade transaction request formed by the mobile time trade controller, wherein the trade transaction request is sent from the mobile terminal to the telecommunication network; current time used information having current amount of used time respectively in each category of the plurality of categories, wherein the current time used information is sent from the telecommunication network to the mobile terminal in response to the trade transaction request; a storage in which is stored the current time used information, the storage operatively connected to at least the MSC time trade controller and the tracking module; selection information formed by the mobile time trade controller, indicative of at least a portion of at least one remaining time in one category of the plurality of categories for transfer to at least one other category of the plurality of categories, wherein the selection information is sent from the mobile terminal to the telecommunication network; a remaining time of a respective category being a respective predetermined amount of time during the time interval less a respective current amount of used time for the respective category; and responsive to received selection information at the telecommunication network, at least a portion of at least one remaining time in one category of the plurality of categories being a first amount of time that is converted, according to a one of a pre-set exchange rate and a dynamic exchange rate, into a second amount of time in the at least one other category of the plurality of category, wherein the conversion is in response to selection information received at the telecommunication network.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

Embodiments of the present method and system allow a mobile subscriber to initiate a trade of off-peak minutes for peak minutes using the telecommunications network. The trade of minutes may be negotiated by the network not only in regards to off-peak versus peak minutes, but also for any type of category of usage (for example, peak voice minutes for peak data minutes, etc.). The service provider may establish an "exchange rate" that would be used in the transaction. The trade could be for a particular billing cycle, or across billing cycles. That is, the subscriber could trade off-peak minutes for peak minutes in the current month billing cycle, of could trade up to, for example, 100 minutes of peak usage from this month's billing cycle to next month's billing cycle. In this example, the subscriber may have decided that more minutes would be needed next month, and not all of the minutes are needed this month. In this manner a mobile subscriber may trade, on the last day of the current month, any unused minutes in a particular category for minutes in that category (or any other category) for next month. Each of the trades may be based on a service provider's exchange rate. For example, the following may be different exchange rates used by the service provider:

1. A trade of off-peak minutes for peak minutes in the current billing cycle at a rate of 10 to 1.
2. A push of peak minutes in the current billing cycle to peak minutes in the next billing cycle at a rate of 2 to 1.
3. A pull of peak minutes in the next billing cycle into the peak minute category in the current billing cycle at a rate of 1 to 1.
4. A pull of off-peak minutes in the next billing cycle into the peak minute category of the current billing cycle at a rate of 20 to 1.

Figure 1:
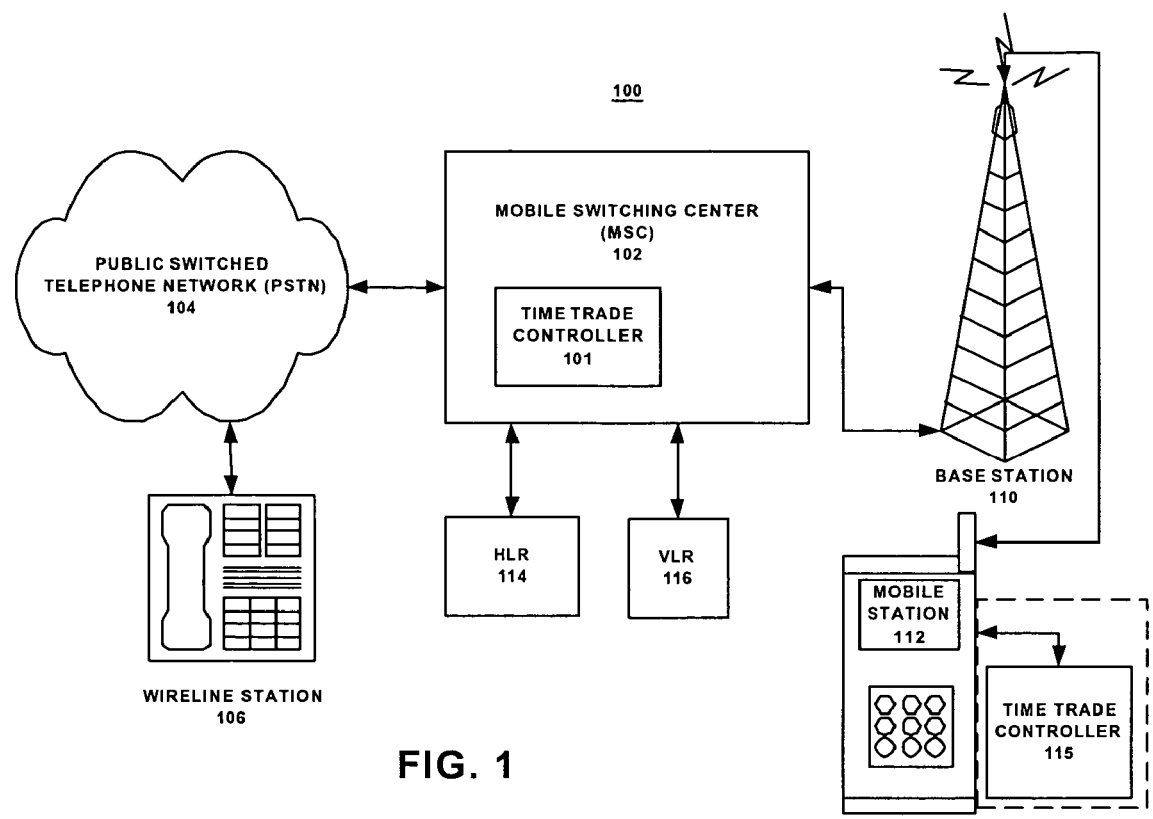
FIG. 1 depicts a block diagram illustrative of a mobile switching center, base station and mobile terminal for use with the present method and system.

Referring to FIG. 1, a system 100 is depicted for allowing a mobile subscriber to negotiate via a mobile terminal a trade of minutes by category according to a predetermined exchange rate as set forth by a service provider. Although the present system and method may be used any type of system (wired and wireless, for example), the subscriber may typically be a mobile subscriber who uses a mobile terminal (also referred to as mobile phone, a cell phone, mobile handset, car phone). The system 100 may have a mobile switching center (MSC) 102. The system may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally can be implemented as the worldwide voice telephone network accessible to all those with telephones and access privileges (e.g., AT&T long distance network).

Each of the mobile terminals 112 may have a home location register (HLR) 114 where data about each of the mobile terminals 112 resides. Some of the mobile terminals 112 may be remotely located from their home location, and in that case, a visiting location register (VLR) 116 is set up locally for each mobile terminal 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system for allowing a mobile subscriber to negotiate via a mobile terminal a trade of minutes by category according to a predetermined exchange rate as set forth by a service provider (for example, time trade controller 101 in the MCS 102 and time trade controller 115 in the mobile terminal 112).

Figure 2:
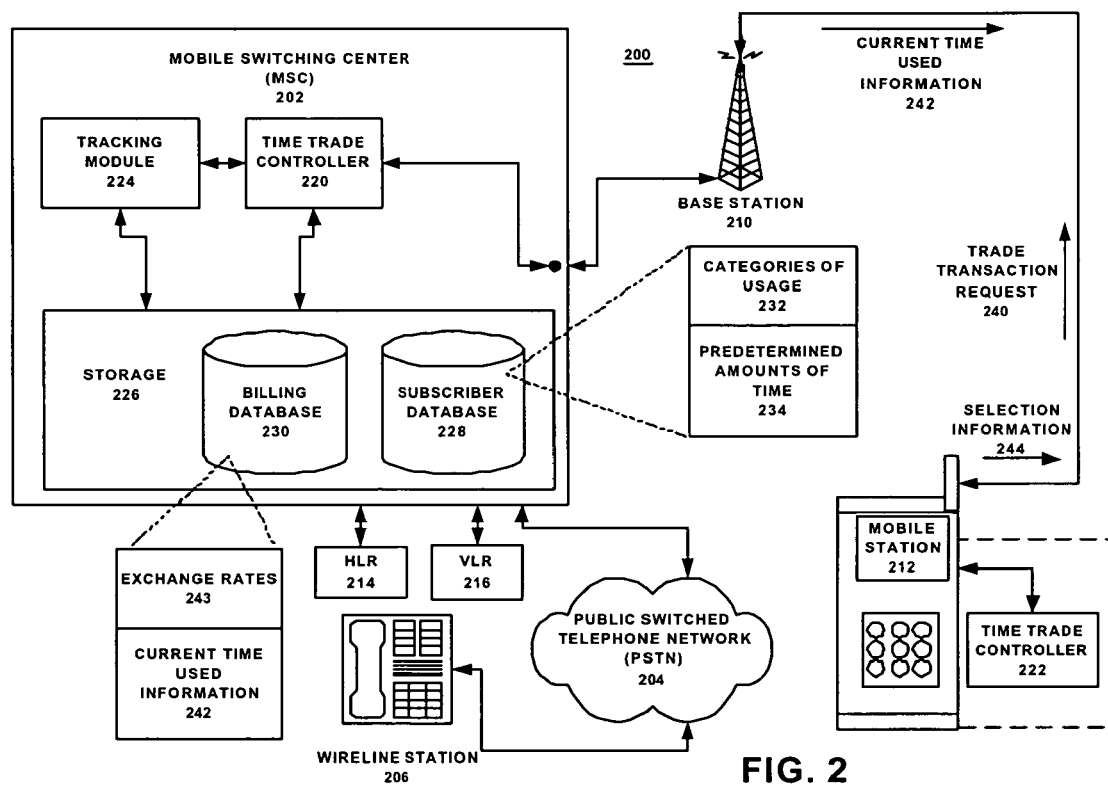
FIG. 2 illustrates a more detailed block diagram illustrative of a mobile switching center, base station, and mobile terminal according to one embodiment of the present method and system.

Referring to FIG. 2, a system 200 is shown for allowing a mobile subscriber to negotiate via a mobile terminal a trade of minutes by category according to a predetermined exchange rate as set forth by a service provider. FIG. 2 depicts a block diagram that is illustrative of a mobile switching center 202 operatively connected to PSTN 204, base station 210, and mobile terminal 212 according to one embodiment of the present method and system. The PSTN 204 routes calls to and from mobile users through the MSC 202, and also routes calls from and to wireline stations 206. The MSC 202 is connected to one or more base stations 210. The base station(s) 210 communicates through the air to mobile terminals 212, which may be of a cellular telephone type or of the wider bandwidth personal communication device type. Mobile terminals 212 may be wireless handsets or automobile mounted stations the same as those shown in FIG. 1. At least the MSC 202 and the base station 210 are part of a telecommunication network. The MSC 202 has operatively connected thereto a VLR 216 and a HLR 214 that interface with the mobile terminal 212.

One embodiment of the system for allowing a mobile subscriber to negotiate via a mobile terminal a trade of minutes by category according to a predetermined exchange rate as set forth by a service provider may have the following elements.

The mobile switching center 202 may have a MSC time trade controller 220 and the mobile terminal 212 may have a mobile time trade controller 222. A storage 226 in the mobile switching center 202 has a subscriber database 228 in which is stored a plurality of categories 232 of usage and respective predetermined amounts of time associated with the mobile terminal 212. The mobile switching center 202 may also have a tracking module 224 that tracks and stores respective time used (current time used information 242) by the mobile terminal 212 in each category 232 of the plurality of categories during a predetermined time interval. The current time used information 242, as well as the exchange rates 243 is stored in a billing database 230 in the storage 226. Alternatively, the current time used information 242 and the exchange rates 243 may be stored in the subscriber database 228. In other embodiments one, some or all of the plurality of categories 232, the amounts of time 234, the current time used information 242, and the exchange rates 243 may be stored in the subscriber database 228, the billing database 230, or any other storage or memory device. The tracking module 224 in this embodiment is operatively connected to the MSC time trade controller 220 and to the storage 226. The time trade controller 220 is also connected to the storage 226.

The tracking module 242 keeps track of the amount of time used in each category 232 of usage. For example, the tracking module 242 may increment a counter of minutes that are used during peak hours for voice calls and a counter for minutes that are used during off-peak hours for voice calls. Similarly, there may be a counter for amount of data transmitted during peak hours and a counter for amount of data transmitted during off-peak hours for data calls.

The time trade controller module 220 may be used to increment and decrement "Pre-determined Amounts of Time" by category of usage based on the trade transactions received from the corresponding mobile terminal 212. For example, if a subscriber wanted to trade 100 off-peak voice minutes for peak voice minutes in the current billing cycle, the time trade controller module 220 would first look up the exchange rate and then decrement the off-peak minutes allocated by 100 and increment the peak minutes allocated for the current billing cycle by 10 based on a 10 to 1 exchange rate.

This information may be stored in the subscriber database 228 because this information may be different based on the subscriber. In other words, high usage customers may get a better exchange rate than smaller users.

The messages and signals may be new messages between the base station 210 and mobile terminal 212. There would be a message to request a trade to the base station 210, to send current usage information to the mobile terminal 212, to communicate the exact trade request to the network via the base station 210, and to confirm the update of the trade request to the mobile terminal 212.

A trade transaction request 240, formed by the mobile time trade controller 222, may be sent from the mobile terminal 212 to the time trade controller 220 in the mobile switching center 202. Current time used information 242, which contains current amount of used time respectively in each category of the plurality of categories 232, is then sent from the mobile switching center 202 to the mobile terminal 212. Selection information 244, formed by the mobile time trade controller 222 and based on the current time used information 242, is sent from the mobile terminal 212 back to the mobile switching center 202. In response thereto at least a portion of at least one remaining time in one category of the plurality of categories 232 is converted into time in at least one other category of the plurality of categories 232. The selection may actually be based on a remaining time in a respective category. The remaining time being a respective predetermined amount of time 234 during the time interval less a respective current amount of used time for the respective category 242. More specifically, responsive to the received selection information 244, at least a portion of at least one remaining time in one category of the plurality of categories is a first amount of time that is converted, according to a one of a pre-set exchange rate and a dynamic exchange rate, into a second amount of time in the at least one other category of the plurality of categories.

Figure 3:
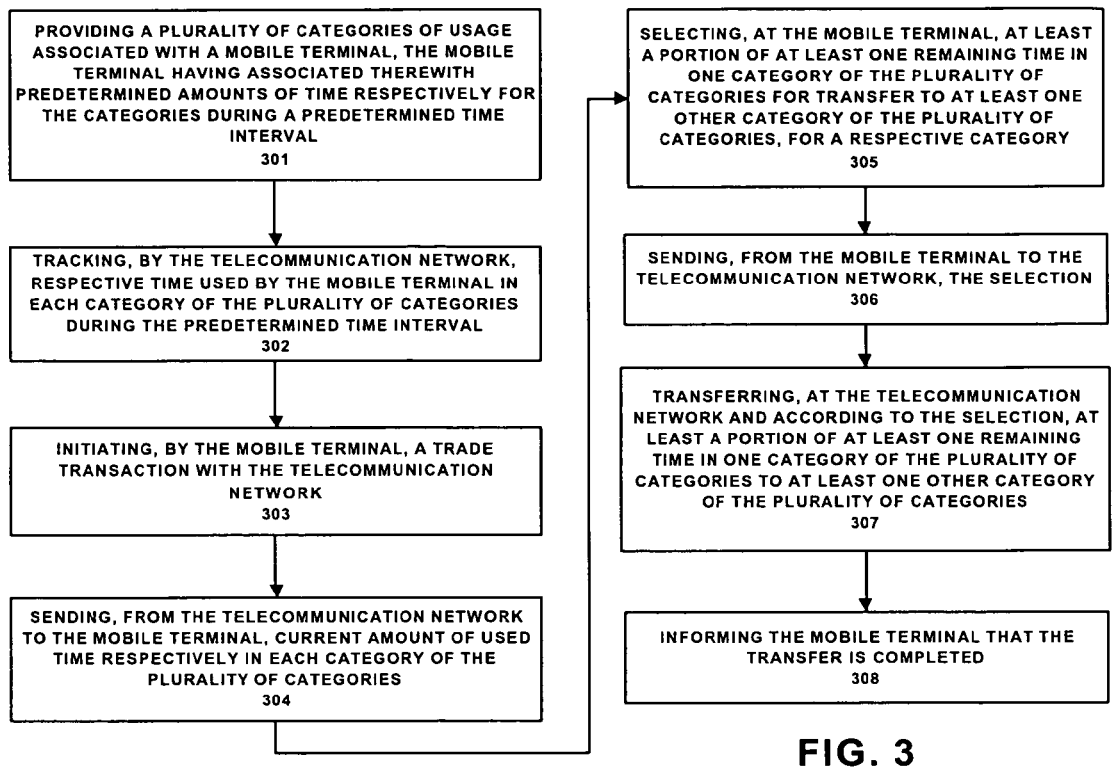
FIG. 3 illustrates a very general flow chart of logical operational steps that may be followed in accordance with one embodiment of the present method and system.

FIG. 3 is a block diagram depicting an embodiment of the present method. In very general terms, the method has the steps of: providing a plurality of categories of usage associated with a mobile terminal, the mobile terminal having associated therewith predetermined amounts of time respectively for the categories during a predetermined time interval (step 301); tracking, by the telecommunication network, respective time used by the mobile terminal in each category of the plurality of categories during the predetermined time interval (step 302); initiating, by the mobile terminal, a trade transaction with the telecommunication network (step 303); sending, from the telecommunication network to the mobile terminal, current amount of used time respectively in each category of the plurality of categories (step 304); selecting, at the mobile terminal, at least a portion of at least one remaining time in one category of the plurality of categories for transfer to at least one other category of the plurality of categories, for a respective category, a remaining time of the respective category being a respective amount of time during the time interval less a respective current amount of used time for the respective category (step 305); sending, from the mobile terminal to the telecommunication network, the selection (step 306); and transferring, at the telecommunication network and according to the selection, at least a portion of at least one remaining time in one category of the plurality of categories to at least one other category of the plurality of categories (step 307); and informing the mobile terminal that the transfer has been completed (step 308).

Figure 4:
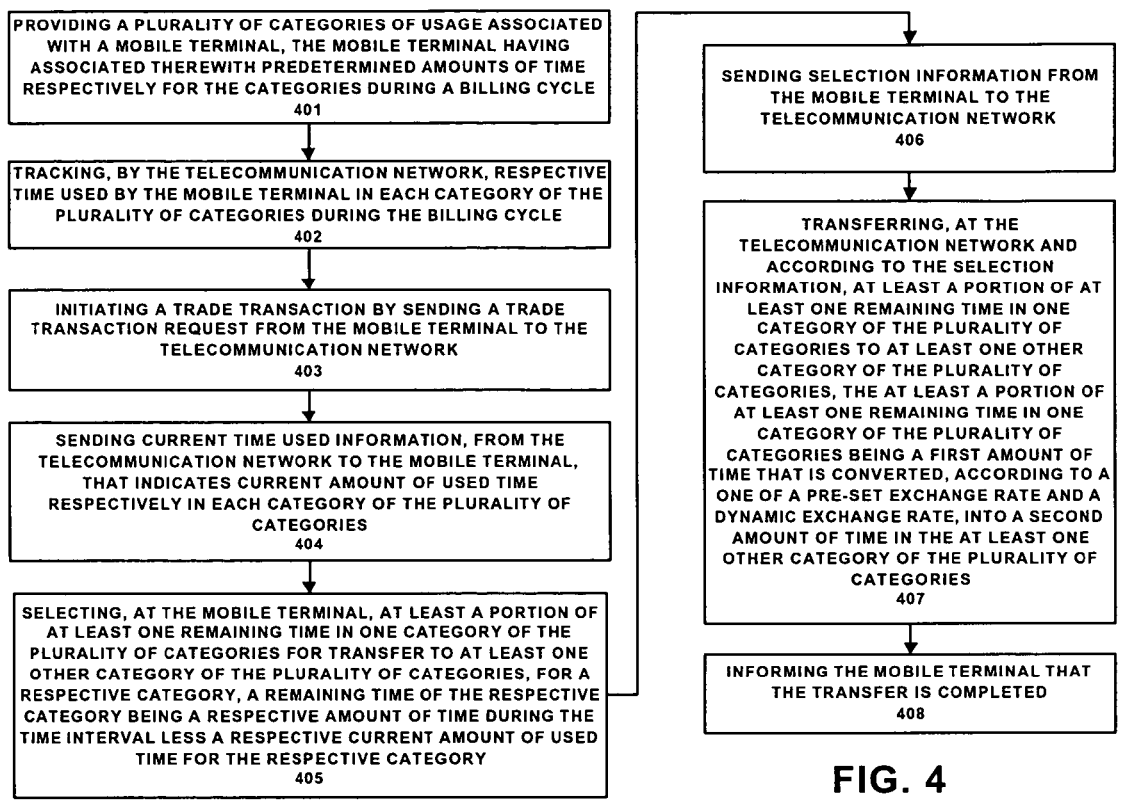
FIG. 4 illustrates another flow chart of logical operational steps that may be followed in accordance with one embodiment of the present method and system.

FIG. 4 is a block diagram depicting another embodiment of the present method. This embodiment of the method in a telecommunications network has the steps of: providing a plurality of categories of usage associated with a mobile terminal, the mobile terminal having associated therewith predetermined amounts of time respectively for the categories during a predetermined time interval, such as a billing cycle (step 401); tracking, by the telecommunication network, respective time used by the mobile terminal in each category of the plurality of categories during the billing cycle (step 402); initiating, by the mobile terminal, a trade transaction with the telecommunication network (step 403); sending, from the telecommunication network to the mobile terminal, current time used information respectively for each category of the plurality of categories (step 404); selecting, at the mobile terminal, at least a portion of at least one remaining time in one category of the plurality of categories for transfer to at least one other category of the plurality of categories, for a respective category, a remaining time of the respective category being a respective amount of time during the time interval less a respective current amount of used time for the respective category (step 405); sending selection information from the mobile terminal to the telecommunication network (step 406); transferring, at the telecommunication network and according to the selection, at least a portion of at least one remaining time in one category of the plurality of categories to at least one other category of the plurality of categories, the at least a portion of at least one remaining time in one category of the plurality of categories being a first amount of time that is converted, according to one of a pre-set exchange rate and a dynamic exchange rate, into a second amount of time in the at least one other category of the plurality of category (step 407); and informing the mobile terminal that the transfer is completed (step 408).

The present system and method may be used with non-mobile phones, as well as, mobile phones. Also, different types of data storage devices may be used with the present method and system. For example, a data storage device may be one or more of a magnetic, electrical, optical, biological, and atomic data storage medium. Also, the trade or transfer of time may occur within a billing cycle or from one billing cycle to another.

The present invention overcomes the drawbacks of the prior art and provides an improved method and system in a telecommunications network for allowing a mobile subscriber to negotiate via a mobile terminal a trade of minutes by category according to a predetermined exchange rate as set forth by a service provider.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for allowing a mobile subscriber to negotiate via a mobile terminal a trade of minutes by category according to a predetermined exchange rate as set forth by a service provider, the method comprising the steps of:

providing a plurality of categories of usage associated with a mobile terminal, the mobile terminal having associated therewith predetermined amounts of time respectively for the categories during a predetermined time interval, the predetermined time interval being a billing cycle;

tracking, by the telecommunication network, respective time used by the mobile terminal in each category of the plurality of categories during the predetermined time interval;

selecting, at the mobile terminal, at least a portion of at least one remaining time in one category of the plurality of categories for transfer to at least one other category of the plurality of categories, for a respective category a remaining time of the respective category being a respective amount of time during the time interval less a respective current amount of used time for the respective category; and transferring, at the telecommunication network and according to the selection, at least a portion of at least one remaining time in one category of the plurality of categories to at least one other category of the plurality of categories, the step of transferring comprising at least one of a trade of off-peak minutes for peak minutes in a current billing cycle at a first predetermined exchange rate, a push of peak minutes in a current billing cycle to peak minutes in a next billing cycle at a second predetermined exchange rate, a pull of peak minutes in a next billing cycle into a peak minute category in a current billing cycle at a third predetermined exchange rate, and a pull of off-peak minutes in a next billing cycle into a peak minute category of a current billing cycle at a fourth predetermined exchange rate;

the telecommunication network having a mobile switching center having a MSC time trade controller and the mobile terminal having a mobile time trade controller, a trade transaction request being formed by the mobile time trade controller, the trade transaction request being sent from the mobile terminal to the time trade controller in the mobile switching center, and selection information, formed by the mobile time trade controller and based on current time used information, being sent from the mobile terminal back to the mobile switching center.

2. The method of claim 1 wherein a respective category of the plurality of categories is one of peak minutes, off-peak minutes, voice minutes, peak data usage, off-peak data usage, weekend minutes, mobile-to-mobile minutes, and message minutes.

3. The method of claim 1 wherein the method further comprises storing in a subscriber database the plurality of categories of usage and the associated respective predetermined amounts of time for the mobile terminal.

4. The method of claim 1 wherein the predetermined time interval is a billing cycle.

5. The method of claim 1 wherein the predetermined time interval is a plurality of billing cycles.

6. The method of claim 1 wherein transferring, at the telecommunication network and according to the selection, the at least a portion of at least one remaining time in one category of the plurality of categories is a first amount of time that is converted, according to a one of a pre-set exchange rate and a dynamic exchange rate, into a second amount of time in the at least one other category of the plurality of category.

7. The method of claim 1 wherein the step of transferring comprises a trade of off-peak minutes for peak minutes in a current billing cycle at an exchange rate of 10 to 1.

8. The method of claim 1 wherein the step of transferring comprises a push of peak minutes in a current billing cycle to peak minutes in a next billing cycle at an exchange rate of 2 to 1.

9. The method of claim 1 wherein the step of transferring comprises a pull of peak minutes in a next billing cycle into a peak minute category in a current billing cycle at an exchange rate of 1 to 1.

10. The method of claim 1 wherein the step of transferring comprises a pull of off-peak minutes in a next billing cycle into a peak minute category of a current billing cycle at an exchange rate of 20 to 1.

11. A method for allowing a mobile subscriber to negotiate via a mobile terminal a trade of minutes by category according to a predetermined exchange rate as set forth by a service provider, the method comprising the steps of:

providing a plurality of categories of usage associated with a mobile terminal, the mobile terminal having associated therewith predetermined amounts of time respectively for the categories during a predetermined time interval, the predetermined time interval being a billing cycle;

tracking, by the telecommunication network, respective time used by the mobile terminal in each category of the plurality of categories during the predetermined time interval;

initiating, by the mobile terminal, a trade transaction with the telecommunication network;

sending, from the telecommunication network to the mobile terminal, current amount of used time respectively in each category of the plurality of categories;

selecting, at the mobile terminal, at least a portion of at least one remaining time in one category of the plurality of categories for transfer to at least one other category of the plurality of categories, for a respective category, a remaining time of the respective category being a respective amount of time during the time interval less a respective current amount of used time for the respective category;

sending, from the mobile terminal to the telecommunication network, the selection; and transferring, at the telecommunication network and according to the selection, at least a portion of at least one remaining time in one category of the plurality of categories to at least one other category of the plurality of categories, the step of transferring comprising at least one of a trade of off-peak minutes for peak minutes in a current billing cycle at a first predetermined exchange rate, a push of peak minutes in a current billing cycle to peak minutes in a next billing cycle at a second predetermined exchange rate, a pull of peak minutes in a next billing cycle into a peak minute category in a current billing cycle at a third predetermined exchange rate, and a pull of off-peak minutes in a next billing cycle into a peak minute category of a current billing cycle at a fourth predetermined exchange rate;

the telecommunication network having a mobile switching center having a MSC time trade controller and the mobile terminal having a mobile time trade controller, a trade transaction request being formed by the mobile time trade controller, the trade transaction request being sent from the mobile terminal to the time trade controller in the mobile switching center, and selection information, formed by the mobile time trade controller and based on current time used information, being sent from the mobile terminal back to the mobile switching center.

12. The method of claim 11 wherein the method further comprises informing, by the telecommunication network, the mobile terminal that the transfer is completed.

13. The method of claim 11 wherein a respective category of the plurality of categories is one of peak minutes, off-peak minutes, voice minutes, peak data usage, off-peak data usage, weekend minutes, mobile-to-mobile minutes, and message minutes.

14. The method of claim 11 wherein the method further comprises storing the plurality of categories of usage and the associated respective predetermined amounts of time for the mobile terminal, current time used information for the mobile terminal, and exchange rates in a subscriber database.

15. The method of claim 11 wherein the predetermined time interval is a billing cycle.

16. The method of claim 11 wherein the predetermined time interval is a plurality of billing cycles.

17. The method of claim 11 wherein the mobile terminal initiates a trade transaction with the telecommunication network by at least one of dialing a prescribed number, performing a voice dial, and using a web based interface.

18. The method of claim 11 wherein transferring, at the telecommunication network and according to the selection, the at least a portion of at least one remaining time in one category of the plurality of categories is a first amount of time that is converted, according to a one of a pre-set exchange rate and a dynamic exchange rate, into a second amount of time in the at least one other category of the plurality of category.

19. The method of claim 11 wherein the telecommunication network effects the transfer in a subscriber database and billing database, which are associated with the mobile terminal, in the telecommunication network.

20. A method for allowing a mobile subscriber to negotiate via a mobile terminal a trade of minutes by category according to a predetermined exchange rate as set forth by a service provider, the method comprising the steps of:
   providing a plurality of categories of usage associated with a mobile terminal, the mobile terminal having associated therewith predetermined amounts of time respectively for the categories during a predetermined time interval, the predetermined time interval being a billing cycle;
   tracking, by the telecommunication network, respective time used by the mobile terminal in each category of the plurality of categories during the predetermined time interval;
   initiating, by the mobile terminal, a trade transaction with the telecommunication network;
   sending, from the telecommunication network to the mobile terminal, current time used information respectively for each category of the plurality of categories;
   selecting, at the mobile terminal, at least a portion of at least one remaining time in one category of the plurality of categories for transfer to at least one other category of the plurality of categories, for a respective category, a remaining time of the respective category being a respective amount of time during the time intervals a respective current amount of used time for the respective category;
   sending, from the mobile terminal to the telecommunication network, the selection;
   transferring, at the telecommunication network and according to the selection, at least a portion of at least one remaining time in one category of the plurality of categories to at least one other category of the plurality of categories, the at least a portion of at least one remaining time in one category of the plurality of categories being a first amount of time that is converted, according to a one of a pre-set exchange rate and a dynamic exchange rate, into a second amount of time in the at least one other category of the plurality of category, the step of transferring comprising at least one of a trade of off-peak minutes for peak minutes in a current billing cycle at a first predetermined exchange rate, a push of peak minutes in a current billing cycle to peak minutes in a next billing cycle at a second predetermined exchange rate, a pull of peak minutes in a next billing cycle into a peak minute category in a current billing cycle at a third predetermined exchange rate, and a pull of off-peak minutes in a next billing cycle into a peak minute category of a current billing cycle at a fourth predetermined exchange rate;
   the telecommunication network having a mobile switching center having a MSC time trade controller and the mobile terminal having a mobile time trade controller, a trade transaction request being formed by the mobile time trade controller, the trade transaction request being sent from the mobile terminal to the time trade controller in the mobile switching center, and selection information, formed by the mobile time trade controller and based on current time used information, being sent from the mobile terminal back to the mobile switching center; and
   informing the mobile terminal that the transfer is completed.

21. The method of claim 20 wherein a respective category of the plurality of categories is one of peak minutes, off-peak minutes, voice minutes, peak data usage, off-peak data usage, weekend minutes, mobile-to-mobile minutes, and message minutes.

22. The method of claim 20 wherein the method further comprises storing the plurality of categories of usage and the associated respective predetermined amounts of time for the mobile terminal, current time used information for the mobile terminal, and exchange rates in a subscriber database in the telecommunication network.

23. The method of claim 20 wherein the predetermined time interval is a billing cycle.

24. The method of claim 20 wherein the predetermined time interval is a plurality of billing cycles.

25. The method of claim 20 wherein the mobile terminal initiates a trade transaction with the telecommunication network by at least one of dialing a prescribed number, performing a voice dial, and using a web based interface.

26. The method of claim 20 wherein the telecommunication network effects the transfer in a subscriber database and billing database, which are associated with the mobile terminal, in the telecommunication network.

27. A system that allows a mobile subscriber to negotiate via a mobile terminal a trade of minutes by category according to a predetermined exchange rate as set forth by a service provider, the system comprising:
   a MSC time trade controller in the telecommunication network and a mobile time trade controller in the mobile terminal;
   a plurality of categories of usage associated with the mobile terminal, the mobile terminal having associated therewith predetermined amounts of time respectively for the categories during a predetermined time interval, the predetermined time interval being a billing cycle;
   tracking module in the telecommunication network, that tracks and stores respective time used by the mobile terminal in each category of the plurality of categories during the predetermined time interval, the tracking module operatively connected to the MSC time trade controller;
   a trade transaction request formed by the mobile time trade controller, wherein the trade transaction request is sent from the mobile terminal to the telecommunication network;
   current time used information having current amount of used time respectively in each category of the plurality of categories, wherein the current time used information is sent from the telecommunication network to the mobile terminal in response to the trade transaction request;

a storage in which is stored the current time used information, the storage operatively connected to at least the MSC time trade controller and the tracking module;

selection information formed by the mobile time trade controller, indicative of at least a portion of at least one remaining time in one category of the plurality of categories for transfer to at least one other category of the plurality of categories, wherein the selection information is sent from the mobile terminal to the telecommunication network;

a remaining time of a respective category being a respective predetermined amount of time during the time interval less a respective current amount of used time for the respective category; and responsive to received selection information at the telecommunication network, at least a portion of at least one remaining time in one category of the plurality of categories being a first amount of time that is converted, according to a one of a pre-set exchange rate and a dynamic exchange rate, into a second amount of time in the at least one other category of the plurality of category, wherein the conversion is in response to selection information received at the telecommunication network the converting comprising at least one of a trade of off-peak minutes for peak minutes in a current billing cycle at a first predetermined exchange rate, a push of peak minutes in a current billing cycle to peak minutes in a next billing cycle at a second predetermined exchange rate, a pull of peak minutes in a next billing cycle into a peak minute category in a current billing cycle at a third predetermined exchange rate, and a pull of off-peak minutes in a next billing cycle into a peak minute category of a current billing cycle at a fourth predetermined exchange rate;

a trade transaction request being formed by the mobile time trade controller, the trade transaction request being sent from the mobile terminal to the time trade controller in the mobile switching center, and selection information, formed by the mobile time trade controller and based on current time used information, being sent from the mobile terminal back to the mobile switching center.

28. The system of claim 27 wherein a respective category of the plurality of categories is one of peak minutes, off-peak minutes, voice minutes, peak data usage, off-peak data usage, weekend minutes, mobile-to-mobile minutes, and message minutes.

29. The system of claim 27 wherein the storage has a subscriber database in which is stored the plurality of categories of usage and the associated respective predetermined amounts of time for the mobile terminal.

30. The system of claim 27 wherein the predetermined time interval is a billing cycle.

31. The system of claim 27 wherein the predetermined time interval is a plurality of billing cycles.

32. The system of claim 27 wherein the mobile terminal initiates a trade transaction with the telecommunication network by at least one of dialing a prescribed number, performing a voice dial, and using a web based interface.

* * * * *